(12) United States Patent
Toyoshima et al.

(10) Patent No.: US 6,496,210 B2
(45) Date of Patent: Dec. 17, 2002

(54) ELECTROPHOTOGRAPHIC IMAGING APPARATUS

(75) Inventors: Tetsuro Toyoshima, Soraku-gun (JP); Tadashi Iwamatsu, Nara (JP); Nobuyuki Azuma, Ibaraki (JP); Yoshinori Mutou, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/977,030

(22) Filed: Oct. 15, 2001

(65) Prior Publication Data

US 2002/0085083 A1 Jul. 4, 2002

(30) Foreign Application Priority Data

Oct. 16, 2000 (JP) ........................................ 2000-315332

(51) Int. Cl.⁷ .............................................. G03G 15/00
(52) U.S. Cl. ...................................................... 347/131
(58) Field of Search ................................ 347/129, 131, 347/132, 140; 358/1.9, 300; 399/130

(56) References Cited

U.S. PATENT DOCUMENTS 6,239,824 B1 * 5/2001 Mutou et al. ............... 347/131
6,433,803 B2 * 8/2002 Mutou et al. ............... 347/131

FOREIGN PATENT DOCUMENTS

JP 11-258877 A 9/1999 ............ G03G/15/00

OTHER PUBLICATIONS

H. Fusayasu, et al., "Numerical Analysis to Estimate Output Image in Electrophotographic Process," Pan–Pacific Imaging Conference/Japan Hardcopy '98, Final Program and Proceedings, (1998), pp. 241–244.
E. Williams, "The Physics and Technology of Xerographic Processes," Krieger Publishing Company, Malabar, Florida, 1993, pp. 88–89.
"Electrophotography–Bases and Application," (Chapter 6), The Society of Electrophotography of Japan, Corona Publishing Company, Tokyo, (1988), pp. 522–540. (Together with a partial translation of said reference).

* cited by examiner

Primary Examiner—Joan Pendegrass
(74) Attorney, Agent, or Firm—Edwards & Angell, LLP; David C. Conlin; Richard J. Roos

(57) ABSTRACT

In a digital electrophotographic imaging process in which a latent electrostatic image is written to a charged photoreceptor using an exposure beam diameter Ds larger than pixel pitch Dp and the image is visualized by development, an unsaturated region of photo-induced discharge characteristics of the photoreceptor is used for an image portion of isolated 1 line, and a saturated region of the photo-induced discharge characteristics of the photoreceptor or gamma characteristics of development is used for an image portion for n lines (n≧2).

8 Claims, 15 Drawing Sheets

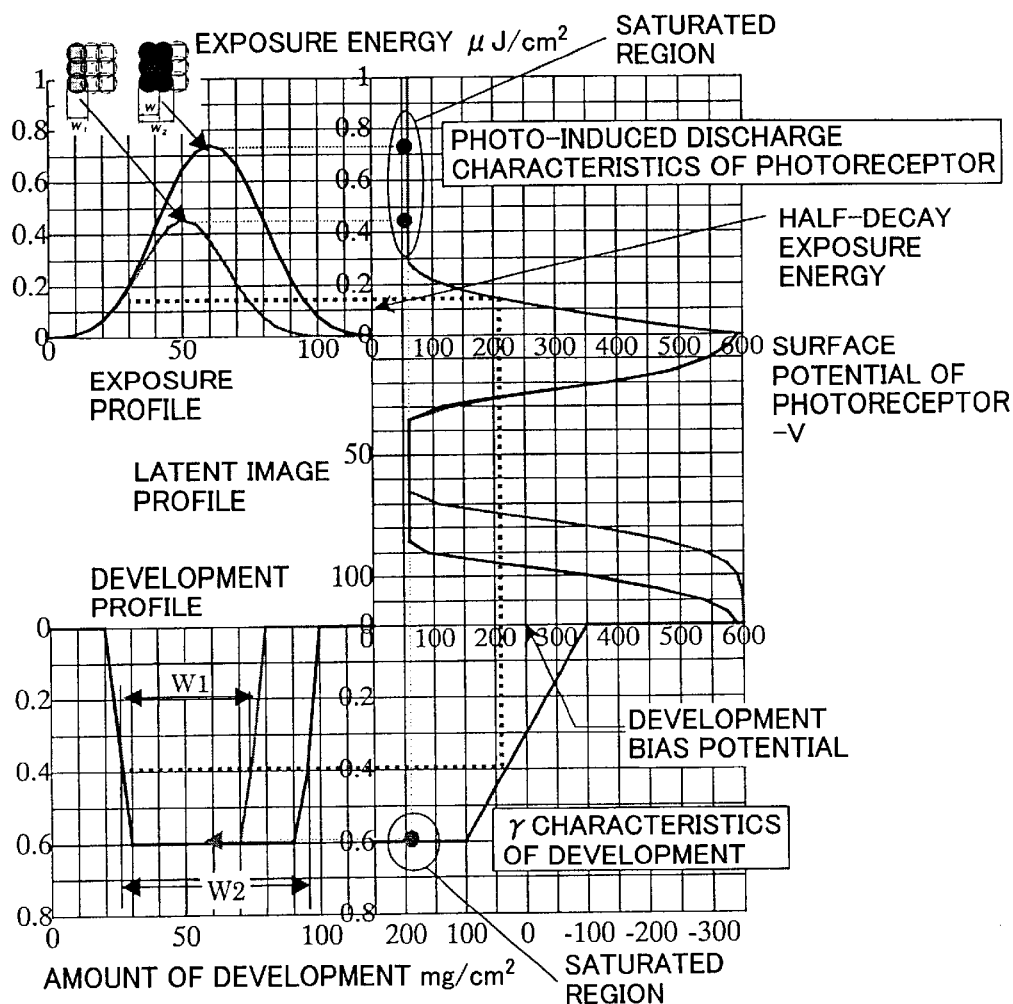

| RESOLUTION | 1200 | dpi |
|---|---|---|

| 1) EXPOSURE CONDITION | | | |
|---|---|---|---|
| LASER POWER | P | 0.20 | mW |
| PULSE WIDTH | Δt | 1.776E-02 | μ sec |
| BEAM WAIST DIAMETER | wx | 30.0 | μ m |
| BEAM WAIST DIAMETER | wy | 30.0 | μ m |
| SCANNING RATE | Vx | 1191.9 | m/s |
| 2) PHOTORECEPTOR PARAMETER | | | |
| HALF-DECAY EXPOSURE ENERGY | Eh | 0.10 | μ J/cm² |
| CHARGE POTENTIAL OF PHOTORECEPTOR | Vo | 600 | V |
| RESIDUAL POTENTIAL VOLTAGE AFTER EXPOSURE | VL | 60 | V |
| THRESHOLD ENERGY FOR SATURATION | Ek | 0.39 | μ J/cm² |
| 3) DEVELOPMENT CONDITION | | | |
| DEVELOPMENT START VOLTAGE | Vth | -100 | V |
| DEVELOPMENT SATURATION VOLTAGE | Vm | 100 | V |
| SATURATION DEVELOPMENT AMOUNT | Wm | 0.6 | mg/cm² |
| BEAM WAIST DIAMETER | Vb | 250 | V |

FIG.7

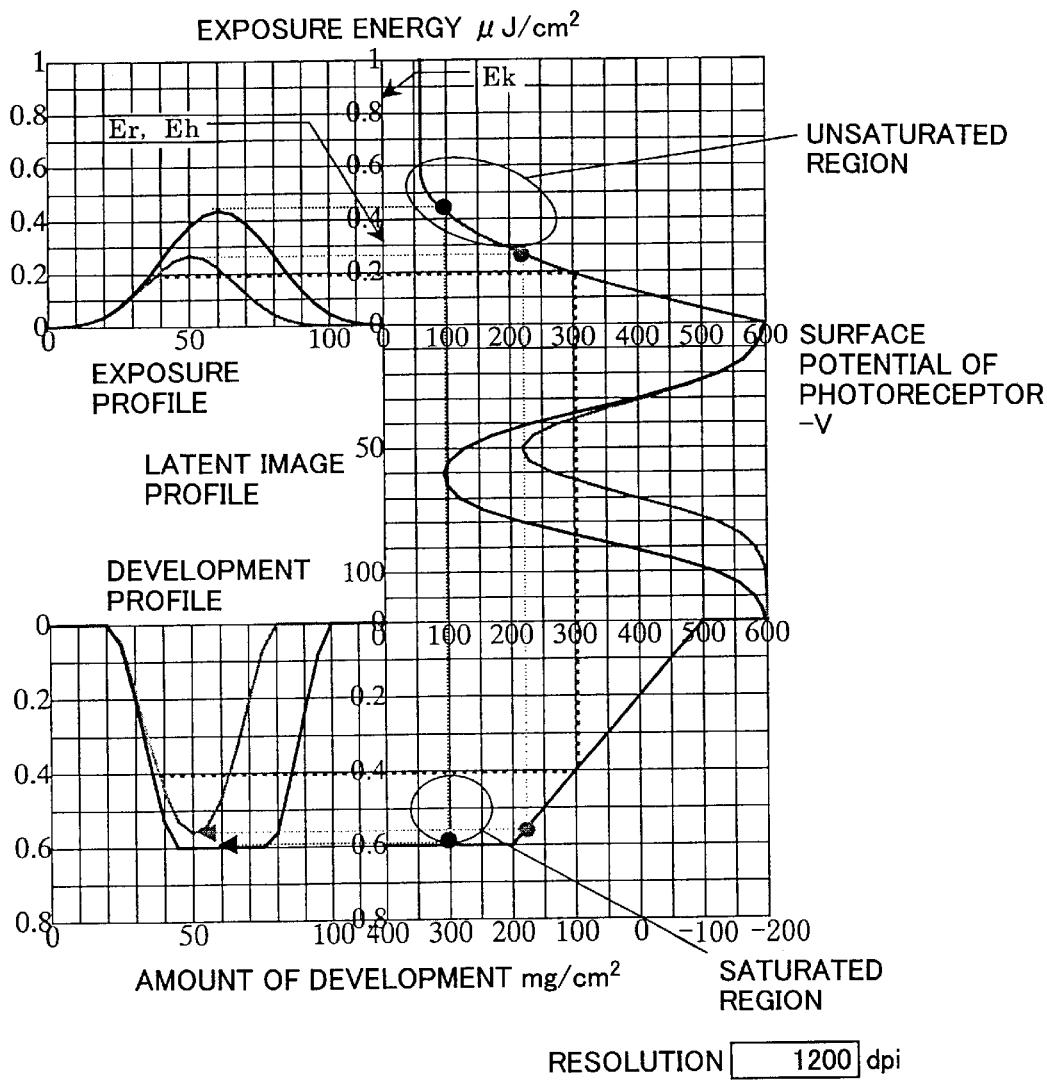

| RESOLUTION | | 1200 | dpi |
|---|---|---|---|
| 1) EXPOSURE CONDITION | | | |
| LASER POWER | P | 0.12 | mW |
| PULSE WIDTH | $\Delta t$ | 1.776E-02 | $\mu$ sec |
| BEAM WAIST DIAMETER | wx | 30.0 | $\mu$ m |
| BEAM WAIST DIAMETER | wy | 30.0 | $\mu$ m |
| SCANNING RATE | Vx | 1191.9 | m/s |
| 2) PHOTORECEPTOR PARAMETER | | | |
| HALF-DECAY EXPOSURE ENERGY | Eh | 0.19 | $\mu$ J/cm$^2$ |
| CHARGE POTENTIAL OF PHOTORECEPTOR | Vo | 600 | V |
| RESIDUAL POTENTIAL VOLTAGE AFTER EXPOSURE | VL | 60 | V |
| THRESHOLD ENERGY FOR SATURATION | Ek | 0.75 | $\mu$ J/cm$^2$ |
| 3) DEVELOPMENT CONDITION | | | |
| DEVELOPMENT START VOLTAGE | Vth | -100 | V |
| DEVELOPMENT SATURATION VOLTAGE | Vm | 200 | V |
| SATURATION DEVELOPMENT AMOUNT | Wm | 0.6 | mg/cm$^2$ |
| BEAM WAIST DIAMETER | Vb | 400 | V |

FIG.10

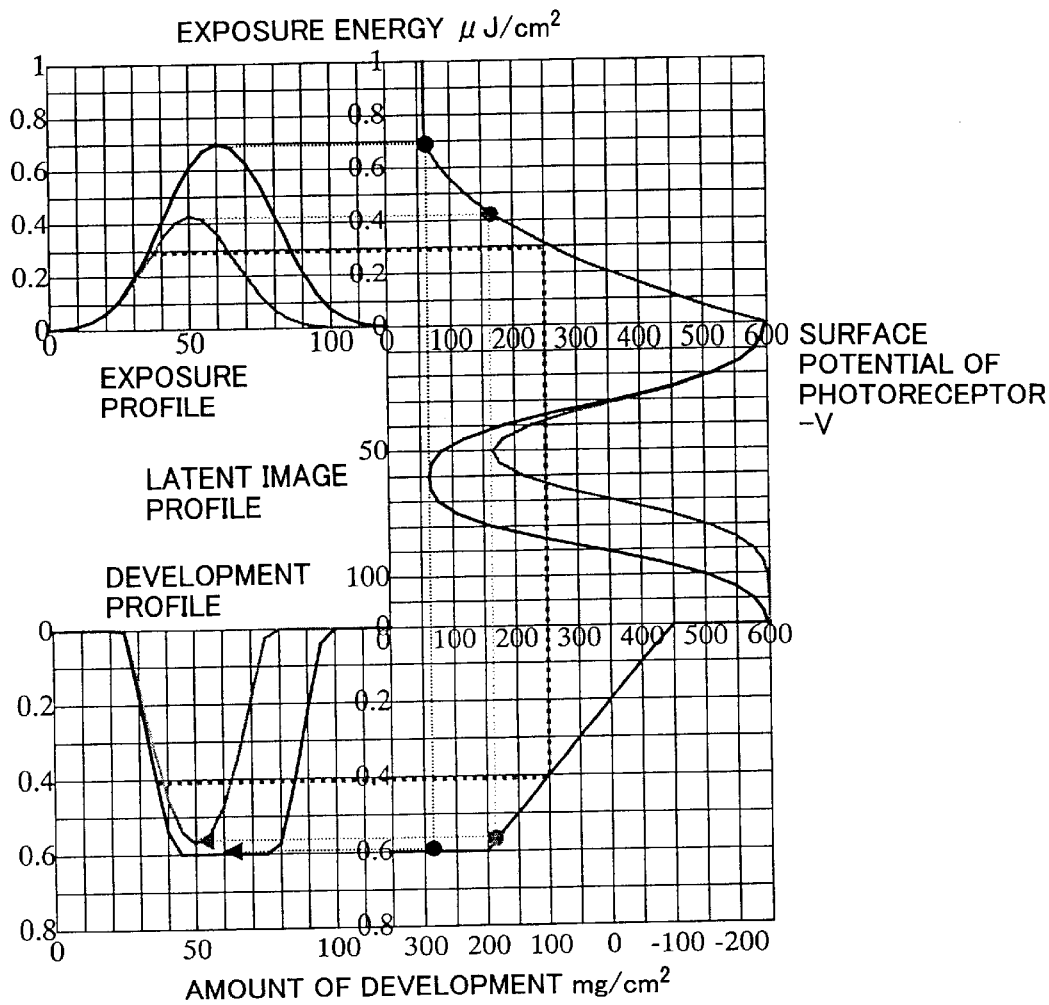

| | RESOLUTION | 1200 | dpi |
|---|---|---|---|
| 1) EXPOSURE CONDITION | | | |
| LASER POWER | P | 0.19 | mW |
| PULSE WIDTH | Δt | 1.776E-02 | μ sec |
| BEAM WAIST DIAMETER | wx | 30.0 | μ m |
| BEAM WAIST DIAMETER | wy | 30.0 | μ m |
| SCANNING RATE | Vx | 1191.9 | m/s |
| 2) PHOTORECEPTOR PARAMETER | | | |
| HALF-DECAY EXPOSURE ENERGY | Eh | 0.26 | μ J/cm² |
| CHARGE POTENTIAL OF PHOTORECEPTOR | Vo | 600 | V |
| RESIDUAL POTENTIAL VOLTAGE AFTER EXPOSURE | VL | 60 | V |
| THRESHOLD ENERGY FOR SATURATION | Ek | 1.02 | μ J/cm² |
| 3) DEVELOPMENT CONDITION | | | |
| DEVELOPMENT START VOLTAGE | Vth | -100 | V |
| DEVELOPMENT SATURATION VOLTAGE | Vm | 200 | V |
| SATURATION DEVELOPMENT AMOUNT | Wm | 0.6 | mg/cm² |
| BEAM WAIST DIAMETER | Vb | 350 | V |

FIG.11

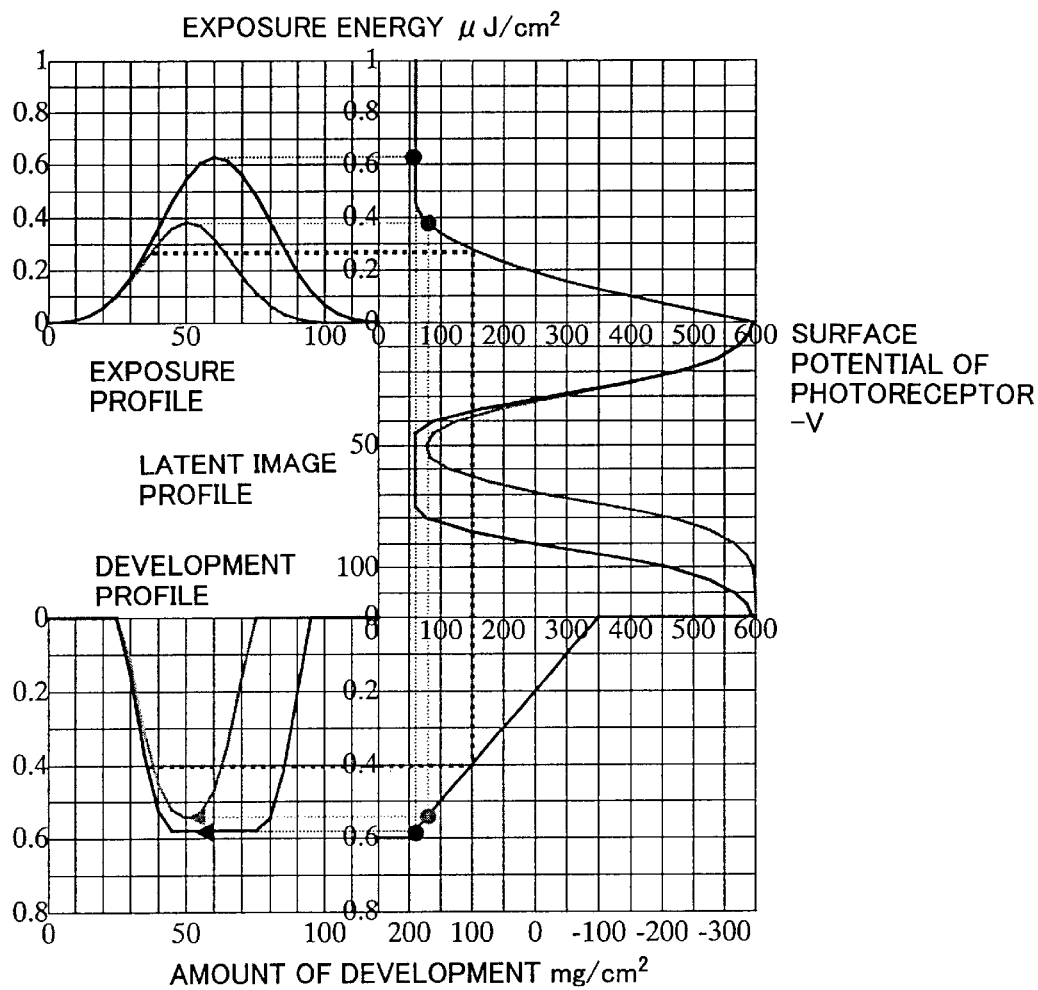

| | RESOLUTION | | 1200 | dpi |
|---|---|---|---|---|
| 1) EXPOSURE CONDITION | | | | |
| LASER POWER | P | | 0.17 | mW |
| PULSE WIDTH | Δt | | 1.776E-02 | μ sec |
| BEAM WAIST DIAMETER | wx | | 30.0 | μ m |
| BEAM WAIST DIAMETER | wy | | 30.0 | μ m |
| SCANNING RATE | Vx | | 1191.9 | m/s |
| 2) PHOTORECEPTOR PARAMETER | | | | |
| HALF-DECAY EXPOSURE ENERGY | Eh | | 0.16 | μ J/cm² |
| CHARGE POTENTIAL OF PHOTORECEPTOR | Vo | | 600 | V |
| RESIDUAL POTENTIAL VOLTAGE AFTER EXPOSURE | VL | | 60 | V |
| THRESHOLD ENERGY FOR SATURATION | Ek | | 0.63 | μ J/cm² |
| 3) DEVELOPMENT CONDITION | | | | |
| DEVELOPMENT START VOLTAGE | Vth | | -100 | V |
| DEVELOPMENT SATURATION VOLTAGE | Vm | | 200 | V |
| SATURATION DEVELOPMENT AMOUNT | Wm | | 0.6 | mg/cm² |
| BEAM WAIST DIAMETER | Vb | | 250 | V |

FIG.12

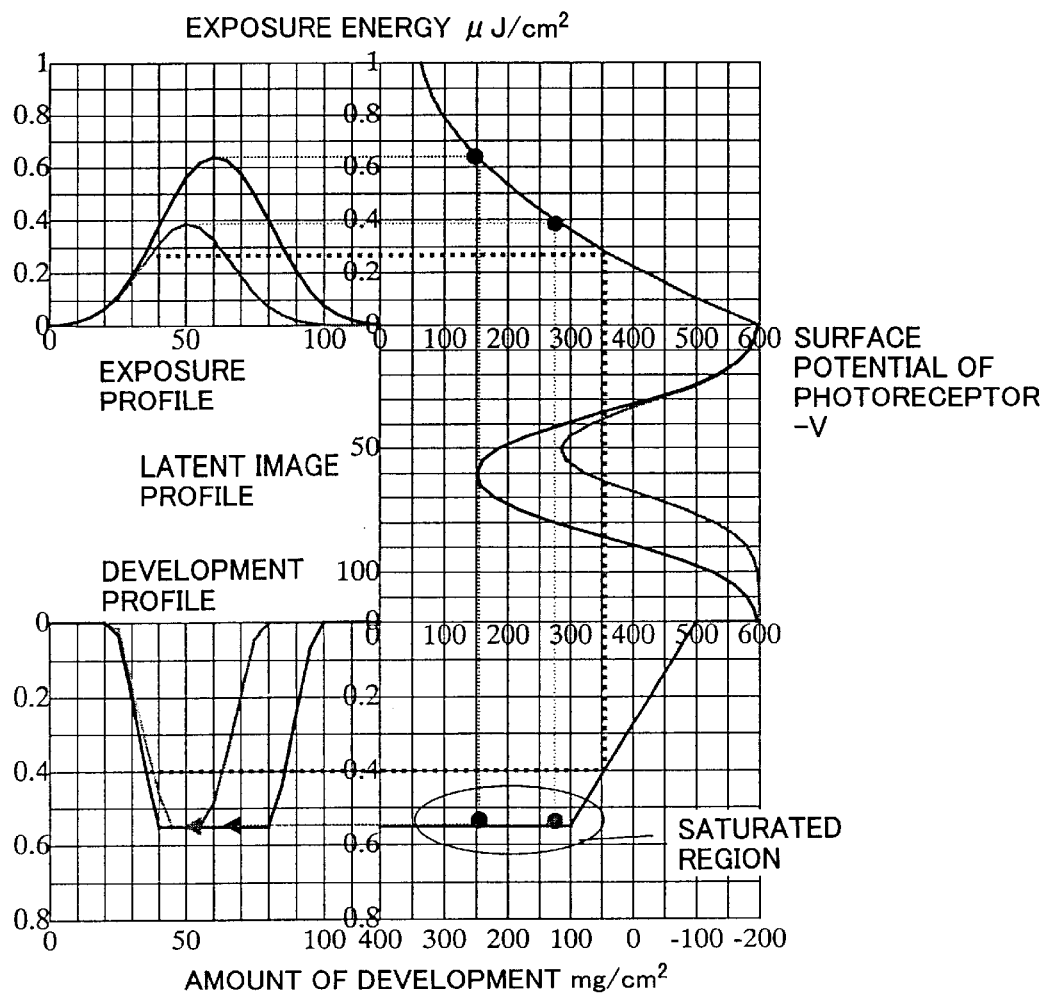

| | RESOLUTION | | 1200 | dpi |
|---|---|---|---|---|
| 1) EXPOSURE CONDITION | | | | |
| LASER POWER | P | 0.18 | mW | |
| PULSE WIDTH | Δt | 1.776E-02 | $\mu$ sec | |
| BEAM WAIST DIAMETER | wx | 30.0 | $\mu$ m | |
| BEAM WAIST DIAMETER | wy | 30.0 | $\mu$ m | |
| SCANNING RATE | Vx | 1191.9 | m/s | |
| 2) PHOTORECEPTOR PARAMETER | | | | |
| HALF-DECAY EXPOSURE ENERGY | Eh | 0.36 | $\mu$ J/cm$^2$ | |
| CHARGE POTENTIAL OF PHOTORECEPTOR | Vo | 600 | V | |
| RESIDUAL POTENTIAL VOLTAGE AFTER EXPOSURE | VL | 60 | V | |
| THRESHOLD ENERGY FOR SATURATION | Ek | 1.41 | $\mu$ J/cm$^2$ | |
| 3) DEVELOPMENT CONDITION | | | | |
| DEVELOPMENT START VOLTAGE | Vth | -100 | V | |
| DEVELOPMENT SATURATION VOLTAGE | Vm | 200 | V | |
| SATURATION DEVELOPMENT AMOUNT | Wm | 0.55 | mg/cm$^2$ | |
| BEAM WAIST DIAMETER | Vb | 400 | V | |

FIG.15

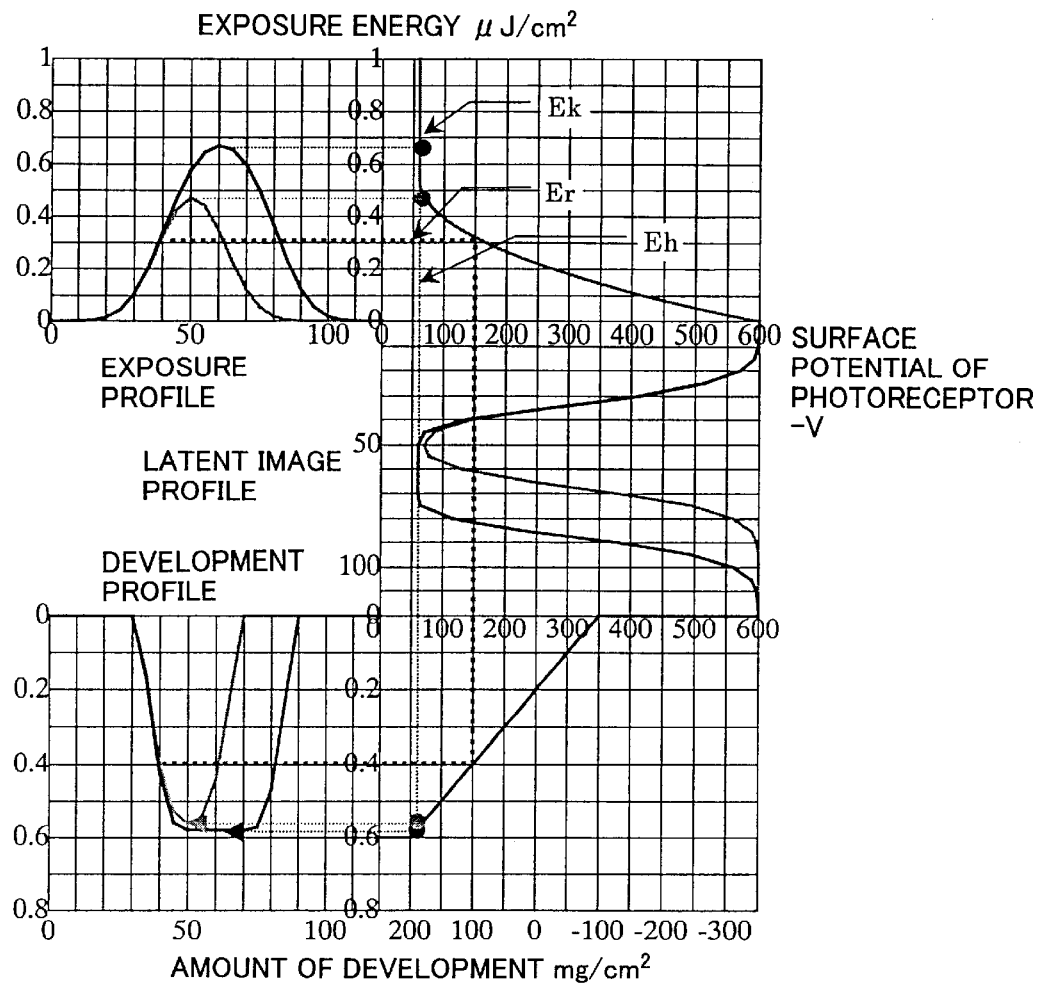

| RESOLUTION | 1200 | dpi |
|---|---|---|

1) EXPOSURE CONDITION

| | | | |
|---|---|---|---|
| LASER POWER | P | 0.16 | mW |
| PULSE WIDTH | $\Delta t$ | 1.776E-02 | $\mu$ sec |
| BEAM WAIST DIAMETER | wx | 20.0 | $\mu$ m |
| BEAM WAIST DIAMETER | wy | 20.0 | $\mu$ m |
| SCANNING RATE | Vx | 1191.9 | m/s |

2) PHOTORECEPTOR PARAMETER

| | | | |
|---|---|---|---|
| HALF-DECAY EXPOSURE ENERGY | Eh | 0.18 | $\mu$ J/cm$^2$ |
| CHARGE POTENTIAL OF PHOTORECEPTOR | Vo | 600 | V |
| RESIDUAL POTENTIAL VOLTAGE AFTER EXPOSURE | VL | 60 | V |
| THRESHOLD ENERGY FOR SATURATION | Ek | 0.71 | $\mu$ J/cm$^2$ |

3) DEVELOPMENT CONDITION

| | | | |
|---|---|---|---|
| DEVELOPMENT START VOLTAGE | Vth | -100 | V |
| DEVELOPMENT SATURATION VOLTAGE | Vm | 200 | V |
| SATURATION DEVELOPMENT AMOUNT | Wm | 0.6 | mg/cm$^2$ |
| BEAM WAIST DIAMETER | Vb | 250 | V |

FIG.18

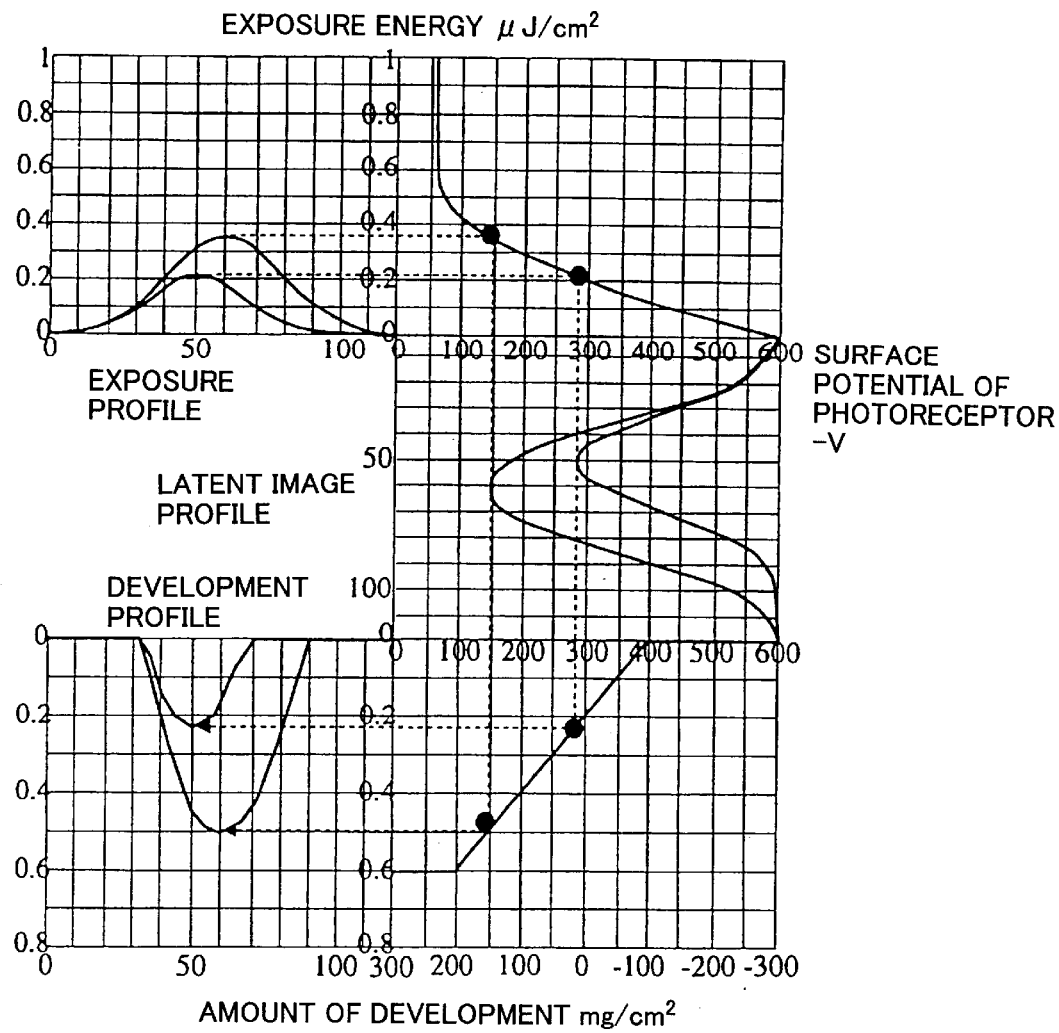

| | RESOLUTION | 1200 | dpi |
|---|---|---|---|

1) EXPOSURE CONDITION

| LASER POWER | P | 0.10 | mW |
|---|---|---|---|
| PULSE WIDTH | Δt | 1.776E-02 | μ sec |
| BEAM WAIST DIAMETER | wx | 30.0 | μ m |
| BEAM WAIST DIAMETER | wy | 30.0 | μ m |
| SCANNING RATE | Vx | 1191.9 | m/s |

2) PHOTORECEPTOR PARAMETER

| HALF-DECAY EXPOSURE ENERGY | Eh | 0.20 | μ J/cm² |
|---|---|---|---|
| CHARGE POTENTIAL OF PHOTORECEPTOR | Vo | 600 | V |
| RESIDUAL POTENTIAL VOLTAGE AFTER EXPOSURE | VL | 60 | V |
| THRESHOLD ENERGY FOR SATURATION | Ek | 0.79 | μ J/cm² |

3) DEVELOPMENT CONDITION

| DEVELOPMENT START VOLTAGE | Vth | -100 | V |
|---|---|---|---|
| DEVELOPMENT SATURATION VOLTAGE | Vm | 200 | V |
| SATURATION DEVELOPMENT AMOUNT | Wm | 0.6 | mg/cm² |
| BEAM WAIST DIAMETER | Vb | 300 | V |

ELECTROPHOTOGRAPHIC IMAGING APPARATUS

BACKGROUND OF THE INVENTION

1. Field of the Invention

The present invention relates to a digital electrophotographic imaging apparatus in which a latent electrostatic image is formed by exposing a photoreceptor by using an optical beam such as a laser beam and the image is visualized by a toner.

2. Description of the Background Art

Table 1 represents relation of resolution per inch (DPI: Dot Per Inch) of a laser beam printer, dot pitch Dp corresponding to the resolution and average beam diameters employed. It can be seen from the table that resolution of the optical system cannot follow the resolution of the printer, as the resolution increases.

TABLE 1

| Resolution | Dot Pitch Dp | Beam Diameter Ds | Ds/Dp |
|---|---|---|---|
| 300 DPI | 84 μm | 100~110 μm | 1.2~1.3 |
| 600 DPI | 42 μm | 75~85 μm | 1.8~2.0 |
| 1200 DPI | 21 μm | 55~65 μm | 2.6~3.1 |

FIG. 2 is a schematic diagram of a laser beam scanning optics, in which a light beam 45 emitted from a laser light source 44 passes through a collimator lens 46 and a cylindrical lens 47, reflected by a polygon mirror 41 and forms an image on a photoreceptor drum 2. As polygon mirror 41 rotates, the light beam scans the photoreceptor drum 2. FIG. 3 is an enlarged view of the image forming portion. The expansion of the image forming beam (beam diameter) Ds with no aberration is given by the following equation, where $\lambda$ represents the wavelength of the laser beam, f represents focal length of the lens and D represents pupil diameter of the laser beam.

$$Ds = 2\lambda/(\pi \cdot NA) = 4\lambda \cdot f/(\pi \cdot D)$$

The focal length f of the laser scanning optics must be as large as necessary for scanning an A3 object. Therefore, in order to make smaller the beam diameter Ds, it is necessary to shorten the wavelength $\lambda$ or to enlarge the pupil diameter D. In order to use a light source having shorter wavelength, the design of the optics must be changed and the photoreceptor material must be reviewed in accordance with the wavelength. When the pupil diameter D is enlarged, the optics becomes larger, and therefore, it is difficult to positively make smaller the beam diameter Ds in practice.

FIGS. 1A to 1C represent relations between the beam diameter Ds and the dot pitch Dp. When the beam diameter Ds and the dot pitch Dp are equal to each other, the ratio of the width $W_1$ of 1 line with respect to the width $W_2$ for 2 lines is 1:2. When the beam diameter Ds becomes larger than the dot pitch Dp, the relation of 1:2 is lost gradually.

Therefore, as can be seen from Table 1, in a current laser beam scanning apparatus, when the resolution is 600 DPI or higher, the ratio between the beam diameter Ds and the dot pitch Dp attains to 2 or higher. Therefore, it becomes difficult to ensure the ratio of the width $W_1$ of 1 line with respect to the width $W_2$ of 2 lines of 1:2.

SUMMARY OF THE INVENTION

The present invention was made in view of the foregoing and its object is to provide an electrophotographic imaging apparatus in which a toner image obtained by development can be fixed at a desired ratio (the ratio of the width of 1 line with respect to the width of 2 lines is 1:2) even when the beam diameter is larger than the dot pitch.

The above described object can be attained by an electrophotographic imaging apparatus employing a digital electrophotographic imaging process in which a latent electrostatistic image is written discretely by exposure modulation means on a charged photoreceptor and the image is visualized by development, characterized in that an unsaturated region of photo-induced discharge characteristic or gamma characteristics of development of the photoreceptor is used when an image of 1 dot or a 1-dot line, that is an image of which lines consist of single dots to be formed, and a saturated region of photo-induced discharge characteristics or gamma characteristics of development is used when an image of 2 dots or at least 2-dots line is to be formed.

Though FIGS. 1A to 1C schematically show the relation between the beam diameter Ds and the line width W, in an actual digital electrophotographic imaging process, exposure energy in accordance with image information is emitted from an exposure apparatus 4 to a photoreceptor 2 which has been uniformly charged by a charger 3, charges at the irradiated portion are lost and a latent image profile is formed, as shown in FIG. 4. Thereafter, charged toner 10 is fixed on the portion where the charges have been lost, by developing means 11, so that a development profile as a toner image is formed. More specifically, an image pattern including images of 1 line and 2 lines is converted through an exposure profile and a latent image profile to a development profile.

The exposure profile depends on power and size of an exposure beam as well as on exposure time. The process in which the exposure profile is determined will be described with reference to laser scanning as an example. Energy distribution I (x, y) per unit time when a Gaussian laser beam, which has laser power P and beam radius of wx, wy, is static is given by the equation (2).

$$I(x, y) = \frac{2P}{\pi \cdot wx \cdot wy} \mathrm{Exp}\left(-\frac{2x^2}{wx^2} - \frac{2y^2}{wy^2}\right) \tag{2}$$

Exposure energy profile Ev (x, y) when pulse width is $\Delta t$ and scanning rate is v is given by the equation (3).

$$Ev(x, y) = \int_0^{\Delta t} I(x - v \cdot t, y) dt = \tag{3}$$

$$\frac{2P}{\pi \cdot wx \cdot wy} \mathrm{Exp}\left(-\frac{2y^2}{wy^2}\right) \int_0^{\Delta t} \mathrm{Exp}\left(-\frac{2(x - v \cdot t)^2}{wx^2}\right) dt$$

In digital exposure, when we represent exposure coordinates as $(x_i, y_j)$, $x_i$ and $y_j$ assume discrete values dependent on the resolution. For example, when it is 1200 DPI, the dot pitch Dp is about 20 μm, and therefore, $x_1, x_2, \ldots$ will be $x_1, x_2, \ldots = 0, 20, 40, 60, \ldots$ Assume that a function G $(x_i, y_j)$ representing the state of exposure of the coordinates $(x_i, y_j)$ is defined by equation (4).

$$G(x_i, y_i) = \begin{cases} 1 & \text{laser ON} \\ 0 & \text{laser OFF} \end{cases} \tag{4}$$

Then, a total exposure profile En (x, y) is given by the following equation (5).

$$E_n(x, y) = \sum_i \sum_j Ev(x - x_i, y - y_j) \cdot G(x_i, y_j) \quad (5)$$

FIG. 6 represents the image profile transfer function of FIG. 5 plotted in detail as a graph. Specifically, it is a chart plotting the process in which an exposure profile corresponding to image information of 1 line and 2 lines having the pixel density of 1200 DPI is converted to a latent image profile in accordance with photo-induced discharge characteristics of photoreceptor 2, and further converted to a development profile in accordance with the gamma characteristics of development.

The exposure beam has a power of 0.2 mW and beam diameter of 60 $\mu$m. Exposure time per dot is 17.76 nsec, and scanning rate is 1191.9 m/sec. Initial potential voltage after charging of photoreceptor 2 is −600V, and half-decay exposure energy is 0.1 $\mu$J/cm$^2$. More specifically, the characteristic is such that when irradiated with optical energy density of 0.1 $\mu$J/cm$^2$, photoreceptor potential falls to −300V, that is, ½ of the initial potential voltage after charging.

In this example, the peak values of exposure energy distribution of 1 line and 2 lines both attain to the saturation values of photo-induced discharge characteristics of the photoreceptor, and the latent image profile and the development profile are both truncated profiles. Therefore, it is impossible to attain the line width ratio $W_1$ and $W_2$ of 1 line and 2 lines, that is, $W1:W_2$ to 1:2. Further, the line width of 1 line attains to 45 $\mu$m when the adhesion amount is 0.4 mg/cm$^2$ (amount of adhesion corresponding to one layer of toner having average grain diameter of 7 $\mu$m), which is larger than the target value (about 25 $\mu$m) of the width of 1 line with 1200 DPI.

FIG. 7 shows an example in which a latent image is formed using an unsaturated region of the photo-induced discharge characteristics of the photoreceptor. The power of the exposure beam was set to 0.12 mW, and half-decay exposure energy Eh of the photoreceptor was set to 0.19 $\mu$J/cm$^2$. The charge potential of the photoreceptor is −600V and the residual potential voltage after exposure $V_L$ is −60V. Surface potential $V_1$ when the photoreceptor receives the exposure energy Et can be modeled by the following equation (6).

$$Ev(x, y) = \int_0^{\Delta t} I(x - v \cdot t, y) dt = \quad (6)$$

$$\frac{2P}{\pi \cdot wx \cdot wy} \mathrm{Exp}\left(-\frac{2y^2}{wy^2}\right) \int_0^{\Delta t} \mathrm{Exp}\left(-\frac{2(x - v \cdot t)^2}{wx^2}\right) dt$$

FIG. 8 is a graph representing the actual measurement of the photo-induced discharge characteristic of the photoreceptor and model given by the equation (6). The saturated region of the photoreceptor is the region in which $Vi=V_L$. When we represent the exposure energy Et by Ek, we can obtain equation (1).

$$Ek = 2(|V0-VL|)^{1/2} \div \{2(|V0-VL|)^{1/2} - \sqrt{2}(|V0-2VL|)^{1/2}\} \cdot Eh \quad (1)$$

The threshold energy for saturation Ek of the photoreceptor used in FIGS. 7 and 8 calculated accordingly is 0.75 $\mu$J/cm$^2$. Therefore, the exposure energies of 1 line and 2 lines shown in FIG. 7 are both in the unsaturated region of the photoreceptor.

Next, the gamma characteristics of development will be considered. When we represent the potential at the start of development by $V_{th}$, saturation potential for development by $V_m$, saturation development amount by $W_m$, potential of the image portion of the photoreceptor by $V_i$ and development bias by $V_B$, the amount of development per unit area M/A can be modeled by the equation (7).

$$\left.\begin{array}{l} \text{when } V_i < V_{th} \\ M/A = 0 \\ \text{when } V_{th} \leq V_i \leq V_m \\ M/A = -\dfrac{W_m \cdot V_{th}}{W_m - V_{th}} + \dfrac{W_m}{V_m - V_{th}} \cdot (V_i - V_B) \\ \text{when } V_i > V_m \\ M/A = W_m \end{array}\right\} \quad (7)$$

FIG. 9 shows a model curve and experimental data. In the example shown in FIG. 7, the gamma characteristics of development and development bias are set such that the amount of development is in an unsaturated region for a portion of 1 line and in a saturated region for a portion of 2 lines.

More specifically, the development characteristics of $V_{th}=-100V$, $V_m=200V$, $W_m=0.6$ mg/cm$^2$ were employed, and the development bias was set to $V_B=-400V$.

As a result, the development profile ratio of 1 line and 2 lines could be set to 1:2. In this manner, by using the unsaturated region of the photoreceptor, it becomes possible to set the ratio of development widths of 1 line and 2 lines to 1:2.

Therefore, in the present invention, means for attaining the above described object is structured in the following manner.

(1) In a digital electrophotographic imaging apparatus writing a latent electrostatic image to a charged photoreceptor using an exposure beam diameter Ds larger than a pixel pitch Dp and visualizing the image by development, an unsaturated region of photo-induced discharge characteristics of the photoreceptor is used for an image portion of an isolated 1 line, and a saturated region of photo-induced discharge characteristic of the photoreceptor or gamma characteristics of development is used for the image portion of n lines (n≧2).

By this structure, even when the beam diameter is larger than the dot pitch, it is possible to fix a toner image obtained by development with a desired ratio (the ratio of development widths of 1 line and 2 lines being 1:2), and necessary image density is ensured.

(2) In a digital electrophotographic imaging apparatus writing a latent electrostatic image discretely to a charged photoreceptor by using an exposure beam diameter Ds larger than pixel pitch Dp and visualizing the image by development, the pixel pitch Dp and the exposure beam diameter Ds satisfy the relation of Dp<Ds≦√2Dp, a saturated region of photo-induced discharge characteristics of the photoreceptor or gamma characteristics of development is used for an image portion of isolated 1 dot, and a saturated region of the photo-induced discharge characteristics of the photoreceptor or gamma characteristics of development is used for the image portion for n lines (n≧2).

By this structure, even when the beam diameter is larger than the dot pitch, it is possible to fix a toner image obtained by development with a desired ratio (the ratio of development widths of 1 line and 2 lines being 1:2), and necessary image density is ensured.

(3) The saturated region of photo-induced discharge characteristics of photoreceptor means a region where potential of the photoreceptor hardly lowers with respect to increment of exposure energy directed to the photoreceptor, exposure energy Ek as a threshold value is represented by equation (1) where V0 represents charge potential of the photoreceptor, VL represents residual potential voltage after exposure and Eh represents half-decay exposure energy:

$$Ek=2(|V0-VL|)^{1/2} \div \{2(|V0-VL|)^{1/2} - \sqrt{2(|V0-2VL|)}^{+e, fra 1/2} + ee\} \cdot Eh \quad (1)$$

and the region where the exposure energy is not smaller than Ek is determined to be a saturated region and a region where the exposure energy is smaller than Ek is determined to be an unsaturated region.

By this structure, even when the beam diameter is larger than the dot pitch, it is possible to fix a toner image obtained by development with a desired ratio, and necessary image density is ensured.

(4) The following relation is set where Er represents an energy level when ratio between extension width of exposure energy distribution of the isolated 1 line and extension width of exposure energy distribution of 2 lines is 1:2, Eh represents exposure energy when initial potential of the photoreceptor is half-decayed, and Ek represents exposure energy as a threshold value thereof:

$$Eh \leq Er < Ek.$$

By this structure, when the unsaturated region of the photoreceptor is used, the ratio of the development profile can be obtained while substantially maintaining the ratio of the exposure energy profile determined by Er.

(5) The following relation is set where Er represents an energy level when ratio between extension width of exposure energy distribution of the isolated 1 line and extension width of exposure energy distribution of 2 lines is 1:2, Eh represents exposure energy when initial potential of the photoreceptor is half-decayed, and Ek represents exposure energy as a threshold value thereof:

$$Eh \leq Er < Ek,$$

and
saturated region of the gamma characteristics of development is used both for the isolated 1 line and 2 lines.

By this structure, a development profile which is stable and insensitive to the variation of development characteristics can be obtained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a characteristic diagram of an example in which development, width increases to 1 line width:2 line width≠1:2.

FIG. 7 is a characteristic diagram satisfying 1 line width:2 line width=1:2.

FIG. 10 is a characteristic diagram when 1 line width:2 line width=1:2 is satisfied, using unsaturated region of the photoreceptor.

FIG. 11 is a characteristic diagram when 1 line width:2 line width=1:2 is satisfied, using unsaturated region of the photoreceptor.

FIG. 12 is a characteristic diagram when 1 line width:2 line width=1:2 is satisfied, using unsaturated region of a photoreceptor having low sensitivity (having large half-decay exposure energy) and using saturated region of/development.

FIG. 15 is a characteristic diagram of an image profile when a red laser is used with the beam diameter reduced to 40 μm.

FIG. 18 is a characteristic diagram when the photo-induced discharge characteristics of the photoreceptor and the gamma characteristics of development are all set in the unsaturated region.

DESCRIPTION OF THE PREFERRED EMBODIMENTS

An electrophotographic imaging apparatus in accordance with an embodiment of the present invention will be described in the following.

Figure 1A:
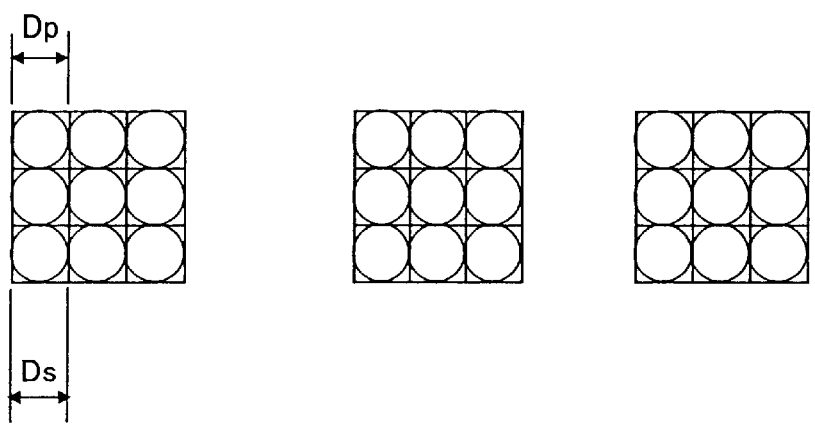
FIGS. 1A to C are illustrations showing relation between beam diameter Ds and dot pitch Dp.
Figure 1B:
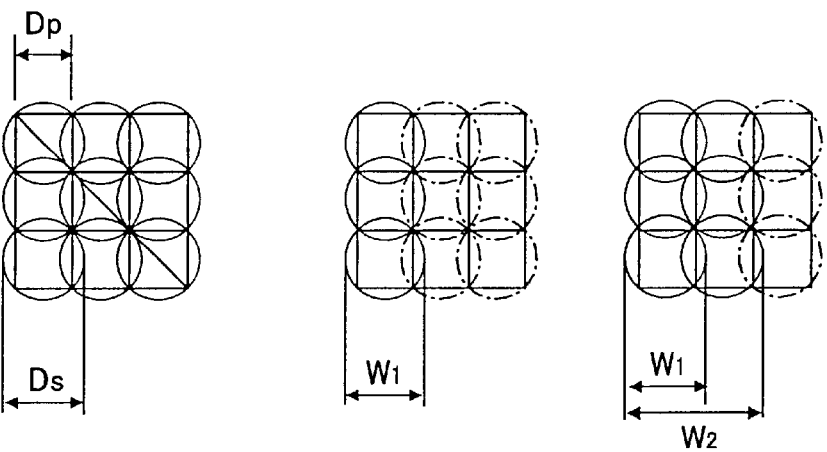
Figure 1C:
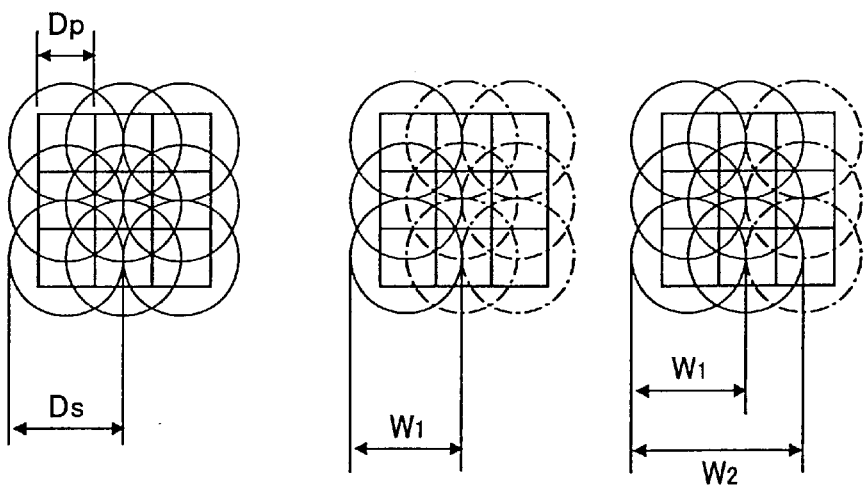
Figure 2:
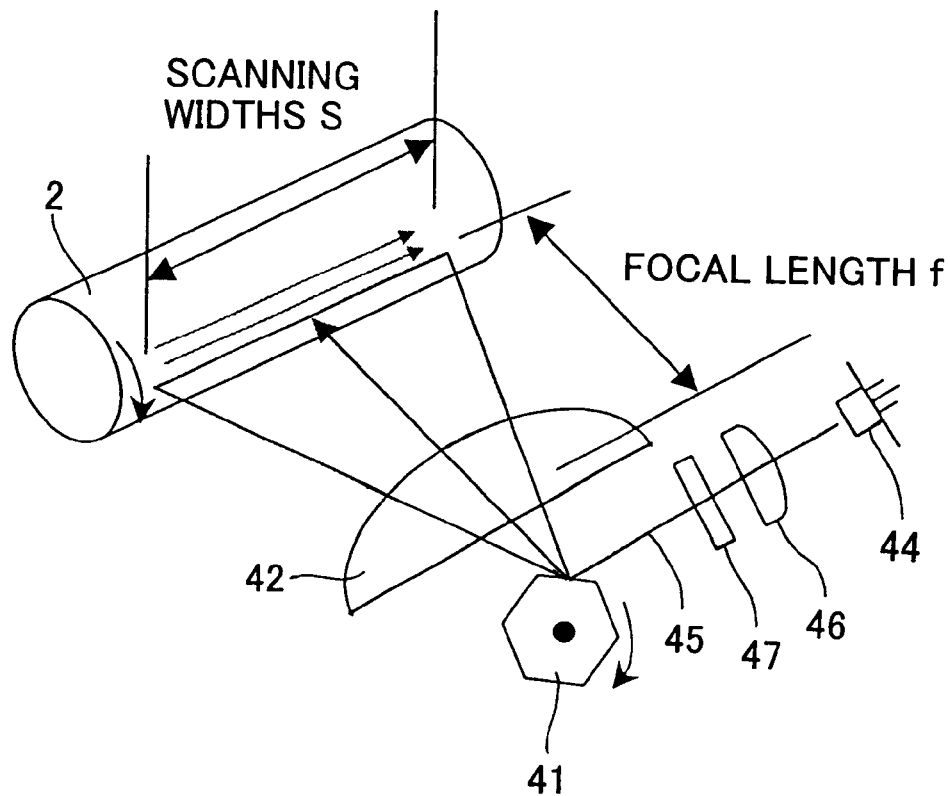
FIG. 2 is a schematic diagram of a laser beam scanning optics.
Figure 3:
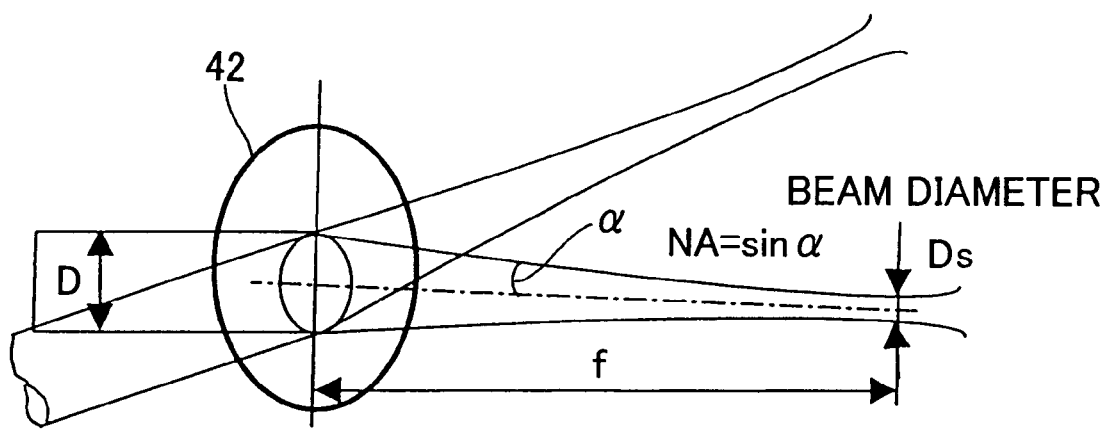
FIG. 3 is an enlarged view of a laser beam image forming portion.
Figure 4:
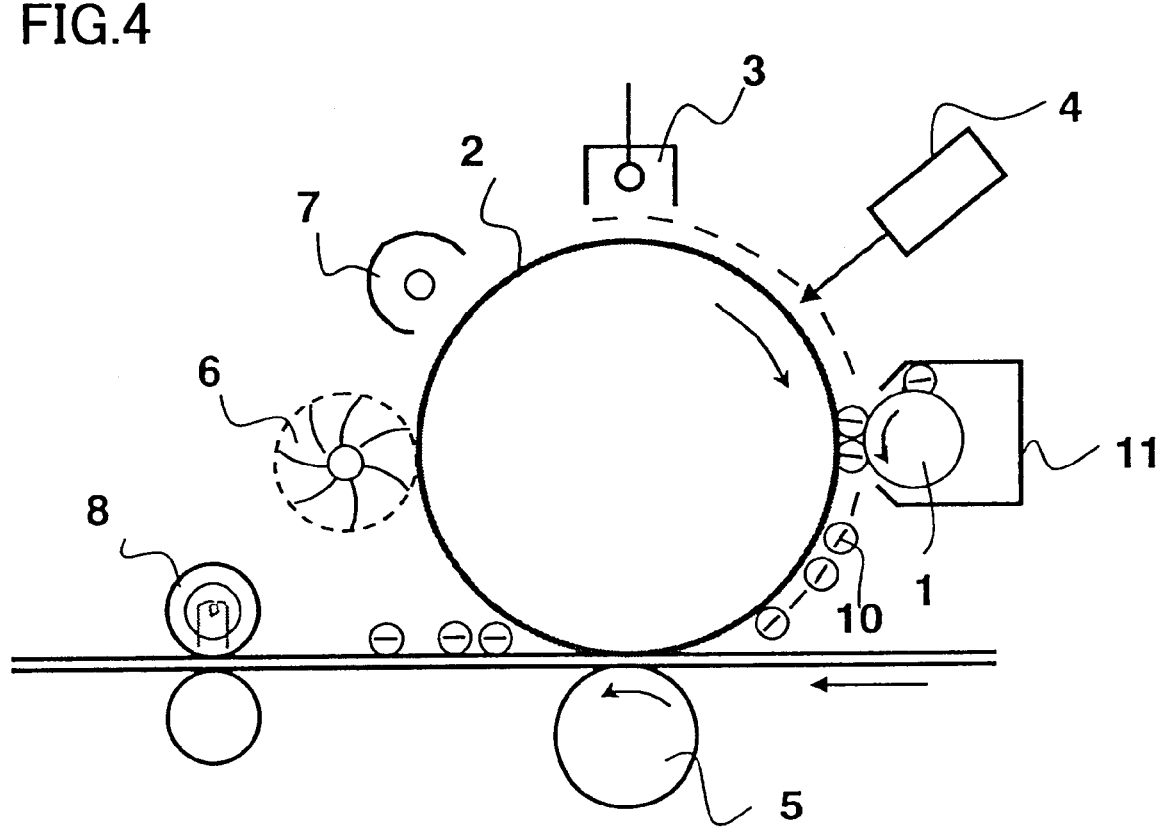
FIG. 4 is an illustration of an electrophotographic image forming apparatus in accordance with the present invention.
Figure 5:
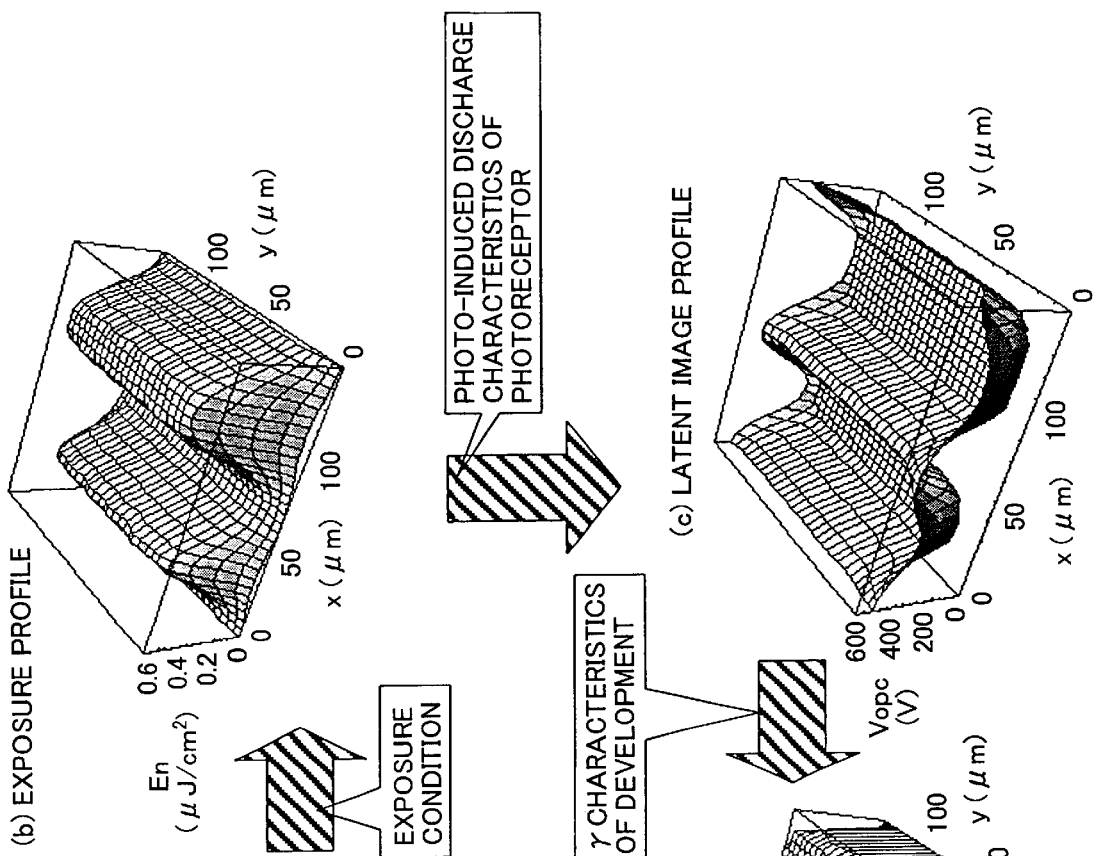
FIG. 5 is an illustration showing change in image profile from exposure to development.
Figure 8:
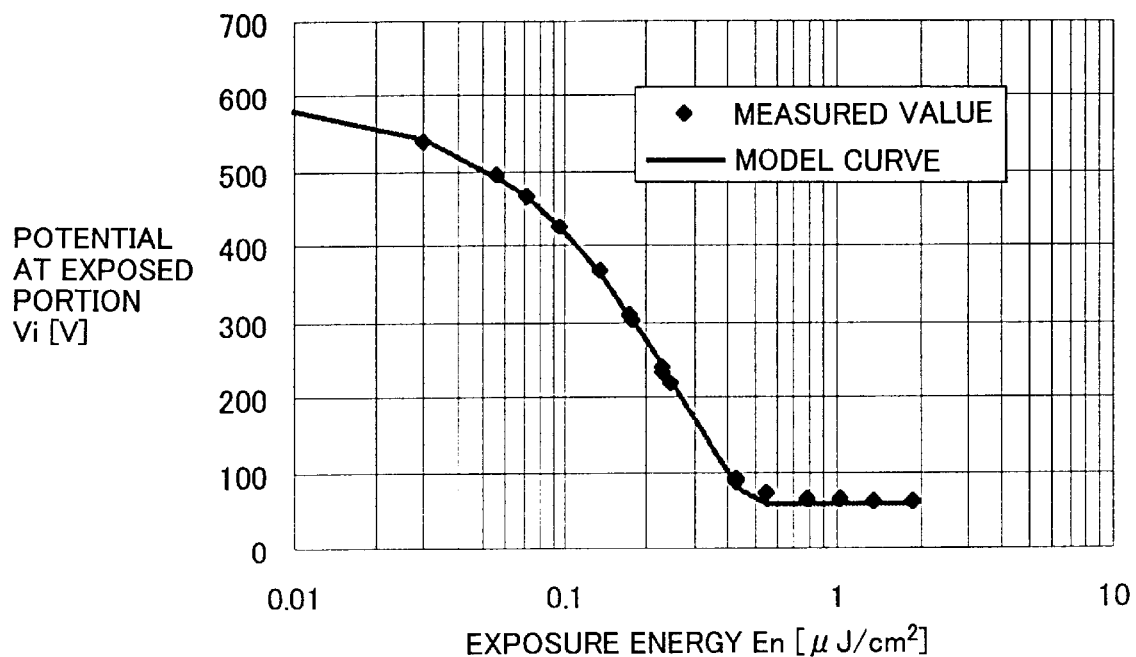
FIG. 8 is a graph representing measurements of photo-induced discharge characteristics of the photoreceptor and a theoretical curve.
Figure 9:
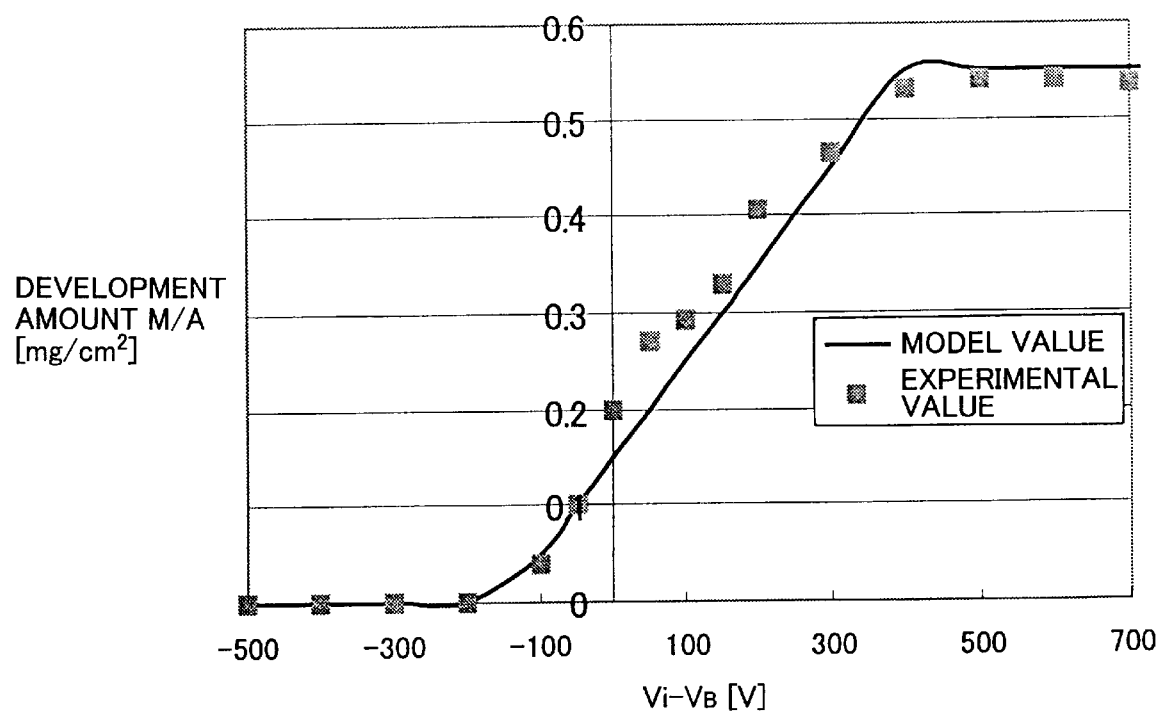
FIG. 9 is a graph of gamma characteristics of development representing the relation between the photoreceptor potential and the amount of development.

First, an exposure apparatus emits light of an LED or laser in accordance with image data, to a photoreceptor, so as to form a latent electrostatic image on the photoreceptor. In the present embodiment, a laser beam scanning apparatus similar to that of FIG. 2 is used. A beam 45 emitted from a semiconductor laser 44 passes through collimator lens 46 and cylindrical lens 47, is reflected by a polygon mirror 41, passes through fθ lens 42 and forms an image on photoreceptor 2.

The fθ lens is of 2-lens type, having focal length of 197.5 mm. Polygon mirror 41 has 6 facets, which is rotated at a high speed of 28,819 rpm (rotation per minutes) by a motor having a fluid bearing. Light emission time per 1 pixel of the laser is 17.76 nsec, and the pixel density corresponds to 1200 DPI. In order to form images with different beam diameters on photoreceptor 2, two different optics were prepared. One uses a semiconductor laser having the wavelength of 785 nm, which is capable of image formation of 60 μm on photoreceptor 2. Another uses laser having the wavelength of 635 nm and is capable of forming an image of 40 μm on photoreceptor 2.

As photoreceptor 2, an organic photoconductor was used, which had on a surface of cylindrical base using as a base material a conductive material such as aluminum, an undercoat layer (UCL), a charge generation layer (CGL) and a charge transport layer (CTL) stacked in this order. The photo-induced discharge characteristics of photoreceptor 2 depends on a carrier generation efficiency of CGL as well as a carrier introduction efficiency from CGL to CTL. In the present embodiment, a phthalocyanine based resin was used for the CGL, and a mixed resin of polycarbonate and polyester was used for the CTL. By mixing these, samples having different photo-induced discharge characteristics were prepared.

Figure 16:
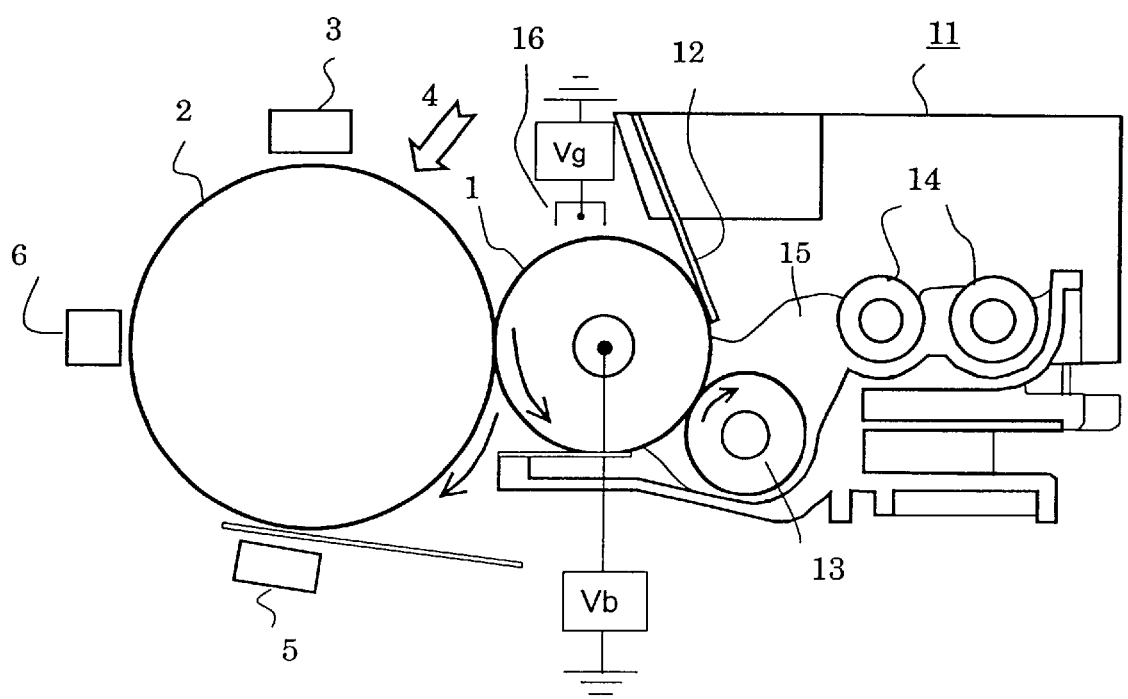
FIG. 16 is a schematic diagram of a developing apparatus.

Next, referring to FIG. 16, the structure of the developing apparatus will be described. The developer 11 includes therein a non-magnetic toner 15 as a developer, a developing roller 1 as a toner bearing member holding the non-magnetic toner 15, a stirring roller 14 and a toner supply roller 13, as well as a toner layer regulating member 12. Charge adjusting means 16 may be provided as needed, downstream of the toner layer regulating member 12.

In the developing apparatus, when developing roller 1 and photoreceptor 2 holding a latent electrostatic image rotate in contact with each other, the latent electrostatic image is developed by the non-magnetic toner 15 held by developing roller 1. Development start voltage Vth, development saturation voltage Vw and saturation development amount Wm depend on the specific charge amount of the toner and resistance value of the developing roller. For example, when the specific charge of the toner is large, the absolute values of Vth and Vw increase and γ becomes flat. Conversely, when the specific charge is small, Vth and Vm become smaller and γ rises.

It is also the fact that the specific charge of the toner and the developing roller resistance vary dependent on the environment such as temperature and moisture. Therefore, setting must be done taking into consideration controllability and stability of development γ. The applicant has found through experiments that when the resistance value of the developing roller is not higher than $10^6 \Omega$, variation of developing characteristics in association with variation of resistance is small. Therefore, in the present embodiment, a conductive urethane rubber roller with carbon dispersed was used, so that the developing roller resistance was set to a resistance value of $10^6 \Omega$ or lower.

As the toner, a negative charged toner using, as a base material, a styrene-acryl based resin was used. Specific charge of the toner can be changed in the range of $-10$ to $-60$ $\mu C/g$, by selecting a friction charge member and a charge control agent to be added to the toner, as well as by controlling the amount of toner to be supplied to the charging member.

Figure 17:
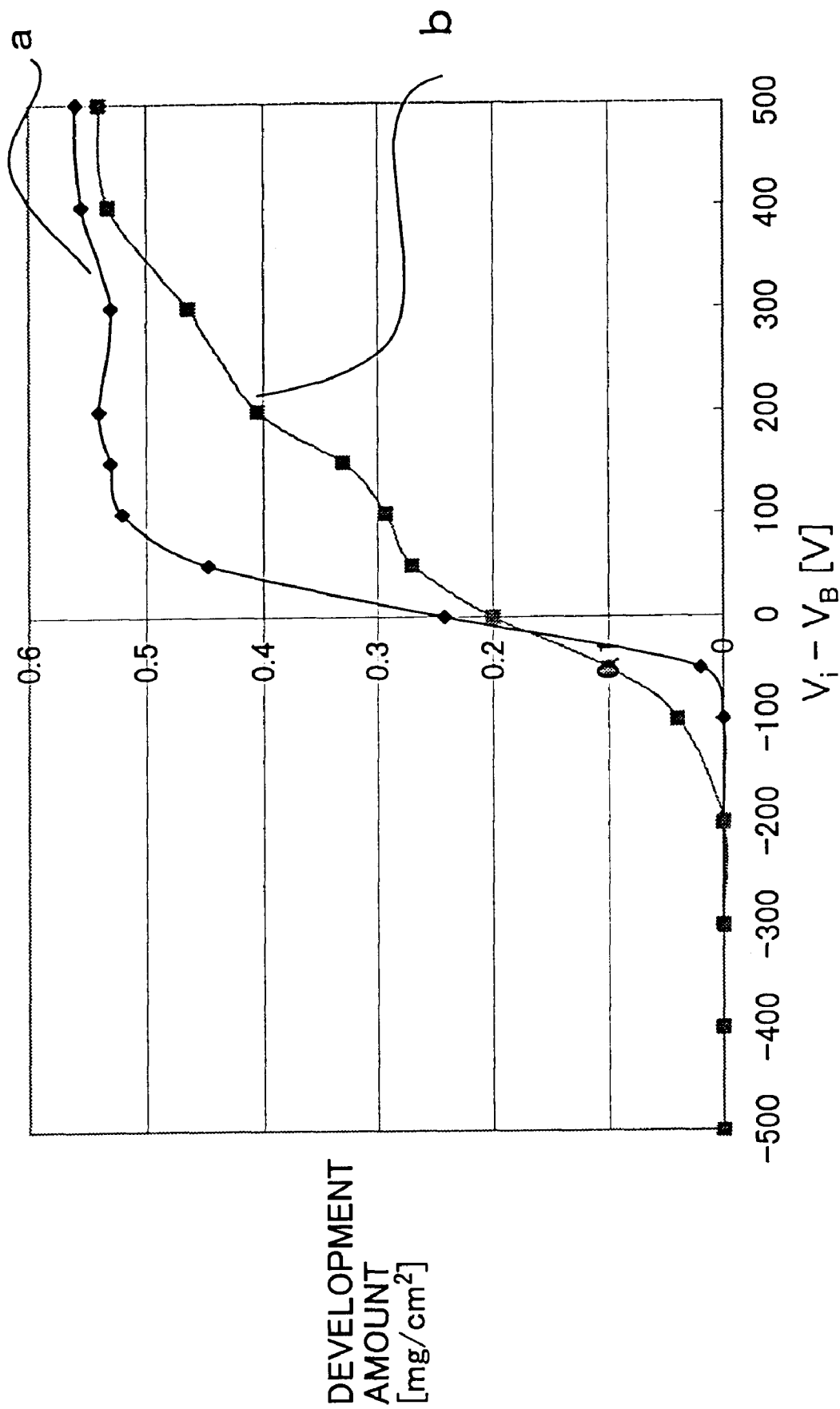
FIG. 17 is a graph representing gamma characteristics of development.

FIG. 17 shows development characteristic a when average specific charge amount of the toner is $-27$ $\mu C/g$ and development characteristic b when it is $-47$ $\mu C/g$. From FIG. 17, it can be seen that development saturation voltage Vw of toner having small specific charge is 100V and hence it is easily saturated. By contrast, the development saturation voltage Vw of the toner having large specific charge is 400V, and hence it is hardly saturated. Therefore, it is effective to use toner having large specific charge when unsaturated region of development is to be utilized, and to use toner having small specific charge when the saturated region is to be used.

In order to improve controllability and stability of the toner specific charge amount, it is effective to supply charges to the toner layer by using a corona charger 16 as charge adjusting means, at a position downstream of the toner layer regulating member and preceeding development. Here, charges are supplied to the toner layer so that the toner potential comes to have the same potential as grid bias Vg of corona charger 16. When unsaturated region of development is to be used, the development profile varies when the amount of development varies because of variation of the specific charges. By always maintaining the amount of charges constant by externally supplying charges by corona charger 16, the development profile when unsaturated region is used can be made stable.

Embodiments of the present invention will be described in the following.

(First Embodiment)

FIG. 10 shows an example in which the unsaturated region of photoreceptor 2 is used, as in the example of FIG. 7. The exposure beam diameter is 60 $\mu m$, exposure time per dot is 17.76 nsec, and scanning rate is 1191.9 m/sec, as in the examples shown in FIGS. 6 and 7. Here, the power P of the exposure beam is set to 0.19 mW and the half-decay exposure energy Eh of the photoreceptor is set to 0.26 $\mu J/cm^2$. Namely, it has such a characteristic that the photoreceptor potential falls to half (½) the initial potential voltage after charging when irradiated with optical energy density of 0.26 $\mu J/cm^2$. Here, by setting development bias $V_B$ to $-350V$, the ratio of development widths of 1 line and 2 lines could be 1:2.

FIG. 11 shows an example in which the saturated region of photoreceptor 2 is used for 2 lines and the unsaturated region is used for 1 line. The exposure beam diameter is 60 $\mu m$, exposure time per dot is 17.76 nsec and the scanning rate is 1191.9 m/sec as in the example above. The power P of the exposure beam was set to 0.17 mW, and the half-decay exposure energy Eh of photoreceptor 2 was set to 0.16 $\mu J/cm^2$. The unsaturated region was used for the developing region and the development bias was set to $-250V$, whereby the ratio of development widths of 1 line and 2 line could be 1:2.

As described above, by setting the photo-induced discharge characteristics of the photoreceptor to the unsaturated region for the image of 1 line and by using the saturated region of the photo-induced discharge characteristics of the photoreceptor or the gamma characteristics of development for an image of 2 lines, it becomes possible to fix the toner to a desired development widths.

(Second Embodiment)

Figure 13:
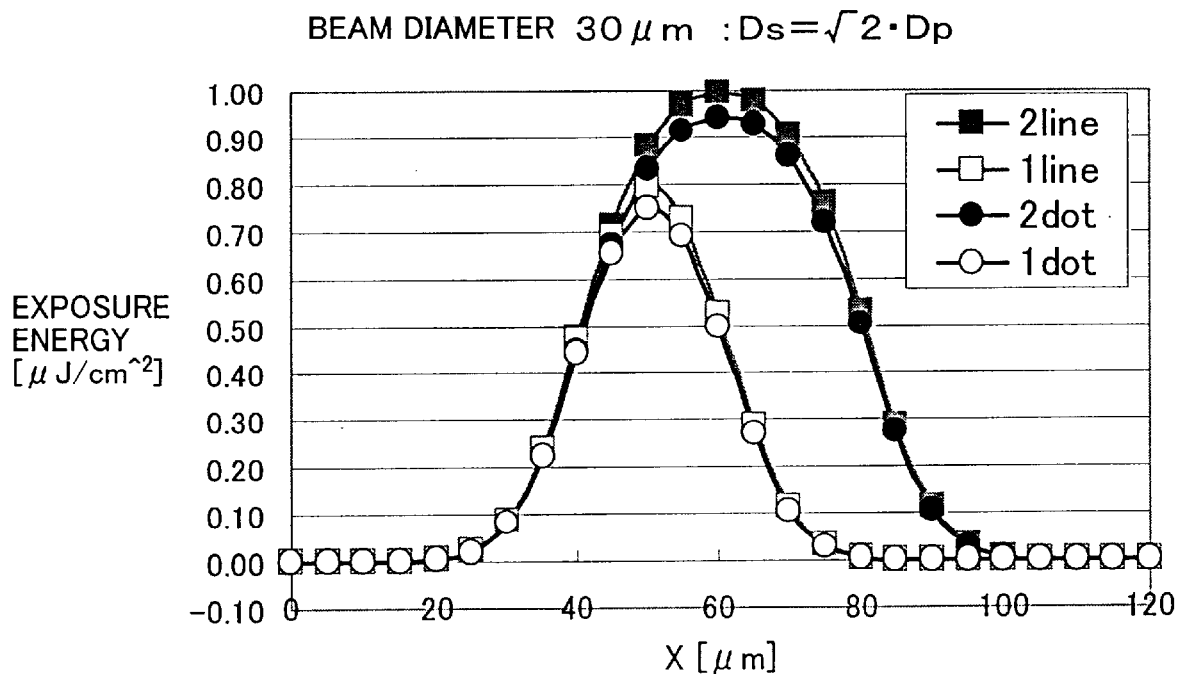
FIG. 13 is a graph representing exposure energy distribution of each image pattern, when beam diameter Ds is √2 times the dot pitch Dp.
Figure 14:
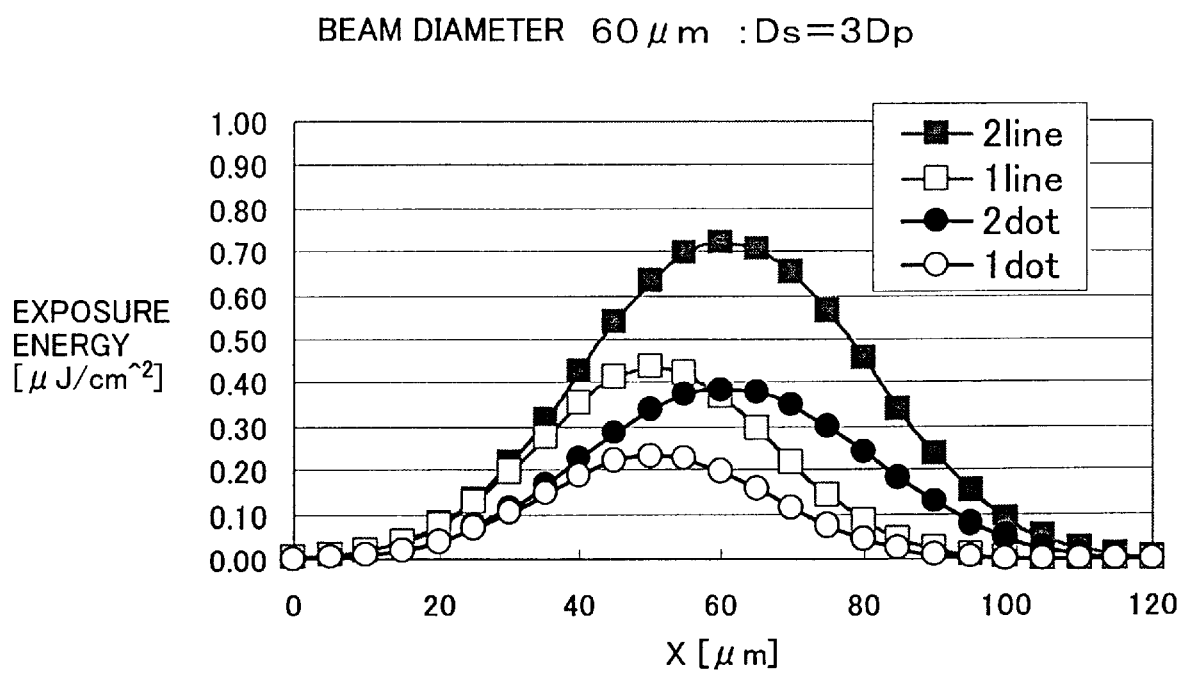
FIG. 14 is a graph representing exposure energy distribution of each image pattern when beam diameter Ds is 3 times the dot pitch Dp.

In the second embodiment, the relation for isolated 1 dot and n dots (n≧2) is defined. FIGS. 13 and 14 show exposure energy profiles for four different image patterns of an isolated 1 dot, isolated 2 dots, an isolated 1 line and 2 lines. When the beam diameter Ds is √2 times the pixel pitch Dp, the exposure energy distribution for isolated 1 dot is approximately the same as the distribution for isolated 1 line, as shown in FIG. 13. Similarly, distribution of 2 dots is approximately the same as the distribution of 2 lines.

In FIG. 14 where the beam diameter Ds is about 3 times the pixel pitch Dp, dot distribution differs from line distribution. Therefore, in the range of Dp<Ds≦√2Dp, the isolated dot and isolated line can be regarded as similar image profiles, while in the range of Ds>√2Dp, when the photo-induced discharge characteristics of the photoreceptor or development conditions are determined considering the isolated dot, the line image width becomes unnecessarily thick, and when the photo-induced discharge characteristics of the photoreceptor or the development conditions are determined considering the isolated line, the isolated dot would be lost. Therefore, the present invention can be applied to isolated dot under the condition of Dp<Ds≦√2Dp.

(Third Embodiment)

In the above-described embodiment, use of the unsaturated region of photoreceptor 2 has been described. In order to make equal the development width to the designed image width, it is desired that the energy level Er when the extension width of exposure energy distribution has the same ratio as the image width is set to a value not smaller than the half-decay exposure energy Eh of the photoreceptor 2 and smaller than saturation energy Ek. By such setting, sufficient exposure amount is ensured in the unsaturated region of gamma characteristics of development. Table 2 represents values Eh, Er and Ek for each of the examples described above.

TABLE 2

|  | Latent Image | | Developed Image | | Energy Density ($\mu J/cm^2$) | | |
| --- | --- | --- | --- | --- | --- | --- | --- |
|  | 1 line | 2 lines | 1 line | 2 lines | Eh | Er | Ek |
| FIG. 6 | Saturated | Saturated | Saturated | Saturated | 0.10 | 0.33 | 0.39 |
| FIG. 7 | Unsaturated | Unsaturated | Unsaturated | Saturated | 0.19 | 0.19 | 0.75 |
| FIG. 10 | Unsaturated | Unsaturated | Unsaturated | Saturated | 0.26 | 0.30 | 1.02 |
| FIG. 11 | Unsaturated | Saturated | Unsaturated | Unsaturated | 0.16 | 0.27 | 0.63 |

By setting the range of $Eh \leq Er < Ek$, it is possible to obtain the ratio of the development profile while substantially maintaining the ratio of the exposure energy profile determined by Er, when unsaturated region of photoreceptor 2 is used. In the example shown in FIG. 6 in which saturated regions only are used, the latent image profile comes to have a truncated shape, and therefore desired ratio of development widths cannot be obtained.

(Fourth Embodiment)

FIG. 12 shows an example in which saturated regions of gamma characteristics of development are used both for 1 line and 2 lines with the energy level set in the range of Er<Eh<Ek, different from the examples above. By using the saturated region of gamma characteristics of development, a development profile that is stable and insensitive to the variation of development characteristics can be obtained. Here, by using unsaturated region both for 1 line and 2 lines and setting the energy level in the range of Er<Eh<Ek as shown in Table 3, the latent image profile comes to have the same development width as the image ratio of 1 line/2 line. In order to attain saturation of development amount, the development bias is set as deep as −400V.

TABLE 3

|  | Latent Image | | Developed Image | | Energy Density ($\mu J/cm^2$) | | |
| --- | --- | --- | --- | --- | --- | --- | --- |
|  | 1 line | 2 lines | 1 line | 2 lines | Eh | Er | Ek |
| FIG. 12 | Unsaturated | Unsaturated | Saturated | Saturated | 0.36 | 0.27 | 1.41 |

The embodiment described above employs laser of 785 nm. FIG. 15 shows an example in which laser of 635 nm is used. Here, a photoreceptor is used for which exposure beam diameter is 40 $\mu$m, the power of exposure beam is 0.16 mW, and the half-decay exposure energy Eh is 0.18 $\mu J/cm^2$. The threshold energy for saturation of photoreceptor 2 is 0.71 $\mu J/cm^2$, and exposure energy density for the isolated 1 line and 2 lines is in the unsaturated region. The relation of the energy level satisfies Eh<Er<Ek, and the ratio of development widths of 1 line and 2 lines could be 1:2.

(Comparative Example)

FIG. 18 shows a comparative example in which the photo-induced discharge characteristics of the photoreceptor and the gamma characteristics of development are all set in the unsaturated regions. When all are set in unsaturated regions, the highest amount of development for 1 line is as low as 0.4 $mg/cm^2$, and hence image density is insufficient.

(Conclusion)

Combinations that satisfy 1 line width:2 lines width=1:2 are further studied, and the inventors reached the conclusion such as shown in Table 4. In Table 4, A, B, C and D are variables representing saturated/unsaturated states of the latent image of 1 line, latent image of 2 lines, developed image of 1 line and developed image of 2 lines. Each variable represents saturation when it is 1 and unsaturation when it is 0.

TABLE 4

| Latent Image | | Developed Image | | |
| --- | --- | --- | --- | --- |
| 1 line A | 2 lines B | 1 line C | 2 lines D | 1:2 Satisfied |
| 0 | 0 | 0 | 1 | ◯ |
| 0 | 0 | 1 | 1 | ◯ |
| 0 | 1 | 0 | 1 | ◯ |
| 0 | 1 | 1 | 1 | ◯ |
| 0 | 1 | 0 | 0 | ◯ |
| 0 | 0 | 0 | 0 | X |
| 1 | 1 | 1 | 1 | X |
| 0 | 0 | 1 | 0 | Impossible |
| 0 | 1 | 1 | 0 | Impossible |

Generally considering the conditions of Table 4, it is found that 1 line width:2 lines width=1:2 can be satisfied when unsaturated region of photo-induced discharge characteristics of the photoreceptor is used for an image portion of 1 line of the latent image and saturated region of gamma characteristics of development or photo-induced discharge characteristics of the photoreceptor is used for the image portion of 2 lines. A combination that makes 1 line saturated and 2 lines unsaturated is physically impossible.

In the foregoing, image profiles for isolated 1 line and 2 lines and isolated 1 dot and 2 dots have been described with reference to the embodiments of the present invention. The present invention, however, is not limited to these and similar development profiles as n=2 can be obtained for n lines (n>2) and n dots (n>2).

The present invention provides the following effects.

According to one aspect, an unsaturated region of photo-induced discharge characteristics of the photoreceptor is used for an image portion of isolated 1 line and a saturated region of the photo-induced discharge characteristics of the photoreceptor or the gamma characteristics of development is used for an image portion of n lines (n>2), and therefore even when the beam diameter is larger than the dot pitch, the toner image obtained by development can be fixed with a desired ratio, and necessary image density is ensured.

According to another aspect, the pixel pitch Dp and the exposure beam diameter Ds satisfy the relation of Dp<Ds≦ √2 Dp, the saturated region of the photo-induced discharge characteristics of the photoreceptor or the gamma characteristics of development is used for an image portion of isolated 1 dot and the saturated region of the photo-induced discharge characteristics of the photoreceptor or the gamma characteristics of development is used for an image portion of n lines (n>2), and therefore even when the beam diameter is larger than the dot pitch, the toner image obtained by development can be fixed with a desired ratio, and the necessary image density is ensured.

According to a still further aspect, the exposure energy Ek as the threshold value is set in accordance with the equation (1), and a saturated region is determined to be the region where exposure energy is larger than Ek and an saturated region is determined to be the region where the exposure energy is smaller than Ek. Therefore, even when the beam diameter is larger than the dot pitch according to claim 1 or 2, the toner image obtained by development can be fixed with a desired ratio, and necessary image density is ensured.

According to a still further aspect, by setting the energy level to be Eh≦Er<Ek, the development profile ratio can be obtained while substantially maintaining the ratio of the exposure energy profile determined by Er, when the unsaturated region of the photoreceptor is used.

According to a still further aspect, the energy level is set to satisfy the relation of Eh<Er<Ek and saturated region of gamma characteristics of development is used both for the isolated 1 line or 2 lines, whereby a development profile which is stable and insensitive to the variation of development characteristics can be obtained.

Although the present invention has been described and illustrated in detail, it is clearly understood that the same is by way of illustration and example only and is not to be taken by way of limitation, the spirit and scope of the present invention.

What is claimed is:

1. A digital electrophotographic imaging apparatus writing a latent electrostatic image to a charged photoreceptor using an exposure beam diameter Ds larger than a pixel pitch Dp and visualizing the image by development, wherein an unsaturated region of photo-induced discharge characteristics of said photoreceptor is used for an image portion of an isolated 1 line, and a saturated region of photo-induced discharge characteristic of said photoreceptor or gamma characteristics of development is used for said image portion of n lines (n≧2).

2. The electrophotographic imaging apparatus according to claim 1, wherein
the saturated region of photo-induced discharge characteristics of photoreceptor is a region where potential of the photoreceptor hardly lowers with respect to increment of exposure energy directed to the photoreceptor, exposure energy Ek as a threshold value is represented by equation (1) where V0 represents charge potential of said photoreceptor, VL represents residual potential voltage after exposure and Eh represents half-decay exposure energy:

$$Ek=2(|V0-VL|)^{1/2} \rightarrow \{2(|V0-VL|)^{1/2}-\sqrt{2}(|V0-2VL|)^{1/2}\}\cdot Eh \quad (1)$$

and wherein the region where said exposure energy is not smaller than Ek is determined to be a saturated region and a region where said exposure energy is smaller than Ek is determined to be an unsaturated region.

3. The electrophotographic imaging apparatus according to claim 1, wherein
the following relation is set where Er represents an energy level when ratio between extension width of exposure energy distribution of said isolated 1 line and extension width of exposure energy distribution of said n lines is 1:n, Eh represents exposure energy when initial potential of said photoreceptor is half-decayed, and Ek represents exposure energy as a threshold value thereof:

$$Eh \leq Er < Ek.$$

4. The electrophotographic imaging apparatus according to claim 1, wherein
the following relation is set where Er represents an energy level when ratio between extension width of exposure energy distribution of said isolated 1 line and extension width of exposure energy distribution of said n lines is 1:n, Eh represents exposure energy when initial potential of said photoreceptor is half-decayed, and Ek represents exposure energy as a threshold value thereof:

$$Eh < Er < Ek,$$

and
saturated region of the gamma characteristics of development is used both for said isolated 1 line and n lines.

5. A digital electrophotographic imaging apparatus writing a latent electrostatic image discretely to a charged photoreceptor by using an exposure beam diameter Ds larger than pixel pitch Dp and visualizing the image by development, wherein said pixel pitch Dp and the exposure beam diameter Ds satisfy the relation of Dp<Ds≦√2Dp, a saturated region of photo-induced discharge characteristics of the photoreceptor or gamma characteristics of the photoreceptor or gamma characteristics of development is used for an image portion of isolated 1 dot, and a saturated region of the photo-induced discharge characteristics of said photoreceptor or gamma characteristics of development is used for said image portion for n lines (n≧2).

6. The electrophotographic imaging apparatus according to claim 5, wherein
the saturated region of photo-induced discharge characteristics of photoreceptor means a region where potential of the photoreceptor hardly lowers with respect to increment of exposure energy directed to the photoreceptor, exposure energy Ek as a threshold value is represented by equation (1) where V0 represents charge potential of said photoreceptor, VL represents residual potential voltage after exposure and Eh represents half-decay exposure energy:

$$Ek=2(|V0-VL|)^{1/2} \rightarrow \{2(|V0-VL|)^{1/2}-\sqrt{2}(|V0-2VL|)^{1/2}\} \cdot Eh \qquad (1)$$

and wherein the region where said exposure energy is not smaller than Ek is determined to be a saturated region and a region where said exposure energy is smaller than Ek is determined to be an unsaturated region.

7. The electrophotographic imaging apparatus according to claim 5, wherein the following relation is set where Er represents an energy level when ratio between extension width of exposure energy distribution of said isolated 1 dot and extension width of exposure energy distribution of said n lines is 1:n, Eh represents exposure energy when initial potential of said photoreceptor is half-decayed, and Ek represents exposure energy as a threshold value thereof:

$$Eh \leq Er < Ek.$$

8. The electrophotographic imaging apparatus according to claim 5, wherein the following relation is set where Er represents an energy level when ratio between extension width of exposure energy distribution of said isolated 1 dot and extension width of exposure energy distribution of said n lines is 1:n, Eh represents exposure energy when initial potential of said photoreceptor is half-decayed, and Ek represents exposure energy as a threshold value thereof:

$$Eh < Er < Ek,$$

and saturated region of the gamma characteristics of development is used both for said isolated 1 dot and n lines.

* * * * *